United States Patent [19]

Kimizuka et al.

[11] 4,445,651
[45] May 1, 1984

[54] TAPE CASSETTE

[75] Inventors: Masanori Kimizuka, Tokyo; Yoshio Yamanishi, Yokohama, both of Japan

[73] Assignee: Sony Corporation, Tokyo, Japan

[21] Appl. No.: 394,134

[22] Filed: Jul. 1, 1982

[30] Foreign Application Priority Data

Jul. 8, 1981 [JP] Japan ............................ 56-101319[U]

[51] Int. Cl.$^3$ .......................... G03B 1/04; G11B 15/32; G11B 23/04
[52] U.S. Cl. .................................... 242/199; 242/200
[58] Field of Search ....................... 242/192, 197–200; 360/96.1, 93, 132

[56] References Cited

U.S. PATENT DOCUMENTS

| | | | | |
|---|---|---|---|---|
| 3,367,593 | 2/1968 | Grant | ................................ | 242/200 X |
| 3,408,017 | 10/1968 | Hashimoto | ........................... | 242/200 |
| 3,865,331 | 2/1975 | Clever et al. | ........................ | 242/199 |
| 4,022,401 | 5/1977 | Kishi | .................................. | 242/198 |

FOREIGN PATENT DOCUMENTS 2655180  8/1978  Fed. Rep. of Germany ...... 242/199

*Primary Examiner*—Leonard D. Christian
*Attorney, Agent, or Firm*—Hill, Van Santen, Steadman & Simpson

[57] ABSTRACT

An improved tape cassette which can be automatically loaded into a tape recording and playback machine by moving it in a horizontal plane and in which the cassette includes pinch rollers and a pair of face gears with radially extending teeth for engagement with movable mating face gears with radially extending teeth to drive the take-up reels and wherein capstan engaging concave portions are formed in alignment with the pinch rollers in the surface of the cassette and with a plurality of head inserting openings formed in a front face of the cassette. Capstans are receivable in the capstan engaging openings so that the pinch rollers will press the tape against the capstan for driving it and the various heads are engageable with the tape through the openings formed in the front surface of the cassette.

4 Claims, 9 Drawing Figures

4,445,651

TAPE CASSETTE

BACKGROUND OF THE INVENTION

1. Field of the Invention

This invention relates in general to a tape cassette and more particularly to an improved tape cassette which can be horizontally inserted and removed from a tape machine.

2. Description of the Prior Art

Conventional compact tape cassettes are illustrated in FIG. 1 which comprises a plan view wherein the upper half of the cassette casing has been removed. In FIG. 1, a lower half of the cassette casing 1 has a central opening portion 2 formed at the front surface side. Openings 3a and 3b are arranged in symmetrical positions of the front surface and small windows 4a and 4b are located on both sides of the central opening 2. Partition plates 5a and 5b separate the right and left opening portions 3a and 3b from the inside of the lower half 1 of the tape cassette and capstan insertion through holes 6a and 6b are formed for receiving the capstan therein. Positioning openings 7a and 7b are formed in the cassette and a pad 8 is attached to a resilient spring member 8' within the central opening portion 2. Erase preventing concave portions 9a and 9b are formed in symmetrical positions at the rear of the lower half of the cassette 1.

Hubs 10a and 10b are mounted symmetrically within the lower half 1 and upper half of the cassette and the hubs 10a and 10b are positioned by inner surface rims not shown of the upper and lower halves of the cassette casing and are arranged to have predetermined axial distance therebetween. When the cassette casing is loaded into a tape recorder, reel shafts 14a and 14b are inserted from the underside of the cassette casing into the hub apertures 11a' and 11b' and a capstan 15 is inserted from the underside in the capstan through the openings 6a and 6b positioning pins 6a and 6b are received within the positioning openings 7a and 7b respectively, so as to accurately position the tape cassette. During record or playback mode of the tape recorder, the tape T is transported by a pinch roller 17 which is inserted from the front surface of the cassette into the opening 3a and 3b which is provided at both sides of the central opening 2 so as to press or grip the tape T against the capstan 15 so that the tape 15 will be driven by the capstan 15 from a tape supply reel which is normally mounted on the left hand hub 10a and the tape is transported by a guide pin 12a, a guide roller 13a and over a front tape path by a record and/or playback head 18 which is in close contact with the tape and is then delivered by a guide roller 13b and a guide pin 12b to the take-up hub 10b where it is wound. An erase head 19a is illustrated in FIG. 1.

Since the tape cassette is loaded and/or unloaded to or from the tape recorder in the axial direction of the reel shafts 14a and 14b and the capstan 15 and due to positional deviations in the tape cassette, clearances have been provided in prior art cassettes between the lower half of the cassette casing and the hubs 10a and 10b, respectively. Additionally, such clearances are provided for the rotary drive between the engaging projections 11a' and 11b' of the hub apertures 11a and 11b formed within the hubs 10a and 10b and extensions 14a and 14b of the reel shafts 14a and 14b into which the reel shafts 14a and 14b are engageably inserted.

When the tape T is transported and rewound, it is possible that the hubs 10a and 10b will swing relative to each other and the tape T can be injured when it is wound with the edge portion of the tape contacting the inside of the upper and lower halves of the cassette casing to cause damage and also to result in a deteriorated audio signal during record or playback operation. Due to the clearances in the rotary direction between the engaging extensions 11a' and 11b' of the hub apertures 11a and 11b of the hubs 10a and 10b and the projections 14a' and 14b' at the reel shafts 14a and 14b causes a servo response when the tape T starts to run and is stopped and this is very undesirable and unsatisfactory.

Also, since when the tape cassette is loaded or unloaded into or from the tape recorder in the axial direction of the reel shafts 14a and 14b and the capstan 15, it is required that the tape recorder be provided with a loading and/or unloading mechanism for loading and unloading the tape cassette and the construction of such apparatus becomes very complicated and the loading and unloading of the tape cassette becomes very difficult particularly for an automatic changer mechanism for the tape cassette. An extremely complicated mechanism is required for an automatic change and thus the conventional tape cassette is unsuitable for use wth automatic changer mechanism.

SUMMARY OF THE INVENTION

It is an object of the present invention to provide an improved tape cassette which eliminates the defects inherent in the conventional tape cassettes.

It is another object of the present invention to provide a tape cassette in which the tape cassette can be loaded and are unloaded in the direction perpendicular to the reel shafts and capstan.

It is a further object of the invention to provide a tape cassette in which hubs are positively engaged with reel shafts in the rotary direction and the hubs are always rotated together with the reel shafts so as to form a unitary unit such that even in the case of starting and stopping the tape transport constant tension will remain on the tape.

According to one aspect of the present invention, there is provided a tape cassette comprising a cassette casing with a plurality of head inserting openings in its front surface and a tape path formed in the cassette on the inside of the openings and with a pair of hubs provided to wind and rewind tape which has been transported along the tape path, a pair of pinch rolls are mounted in the cassette at both end portions of the tape path and a capstan engaging cutout portion is formed on opposite sides in alignment with the pair of pinch rollers and the cutouts extend into at least one of the upper and lower surfaces adjacent the pinch rollers. A pair of face gears with radially extending teeth formed on the end surface of each of the hubs at the centers and with engaging portions formed around the face gears provide for driving the hubs.

Other objects, features and advantages of the present invention will become apparent from the following description taken in conjunction with the accompanying drawings in which like references designate the same elements and parts.

DESCRIPTION OF THE PREFERRED EMBODIMENTS

Figure 1:
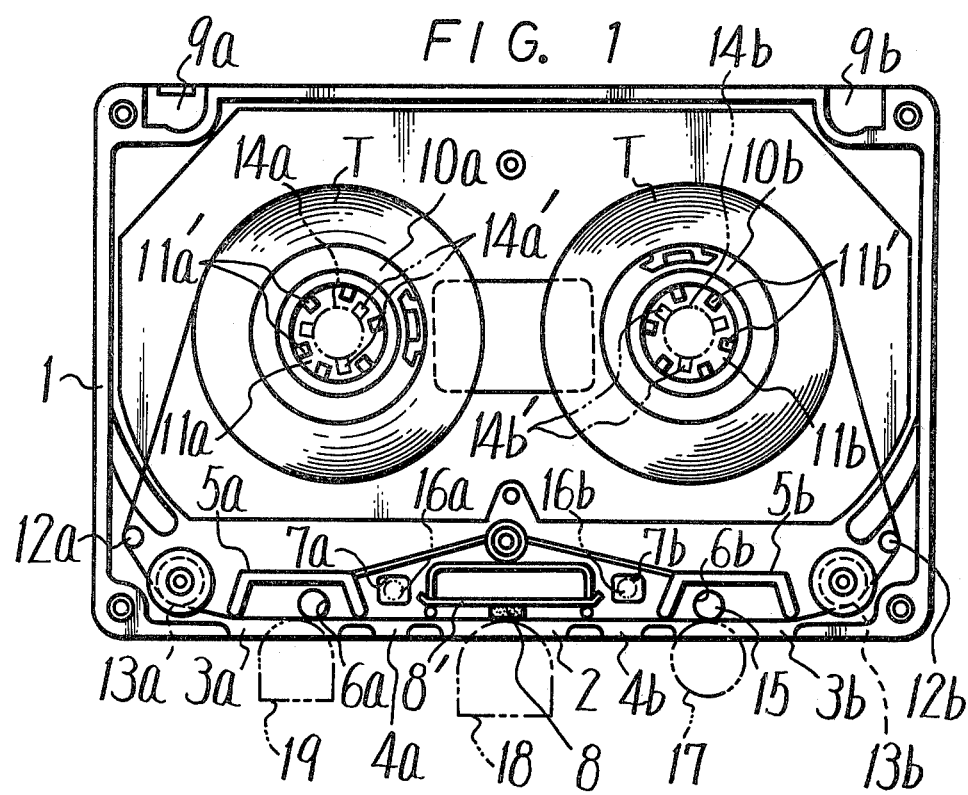
FIG. 1 is a plan view which is used to explain conventional standard compact tape cassette in which the upper half of the cassette casing has been removed.
Figure 2:
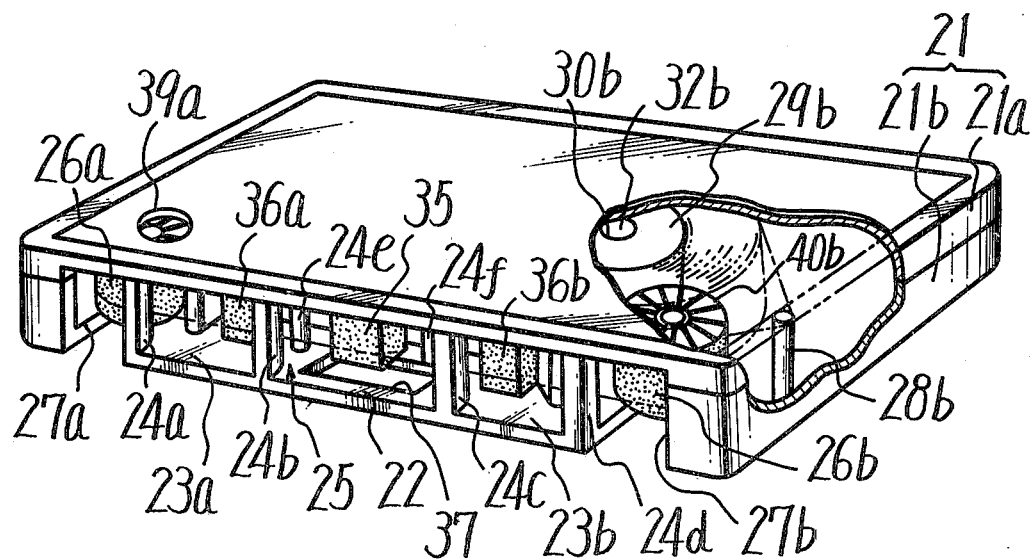
FIG. 2 is a perspective view of one example of a tape cassette according to the present invention.
Figure 3:
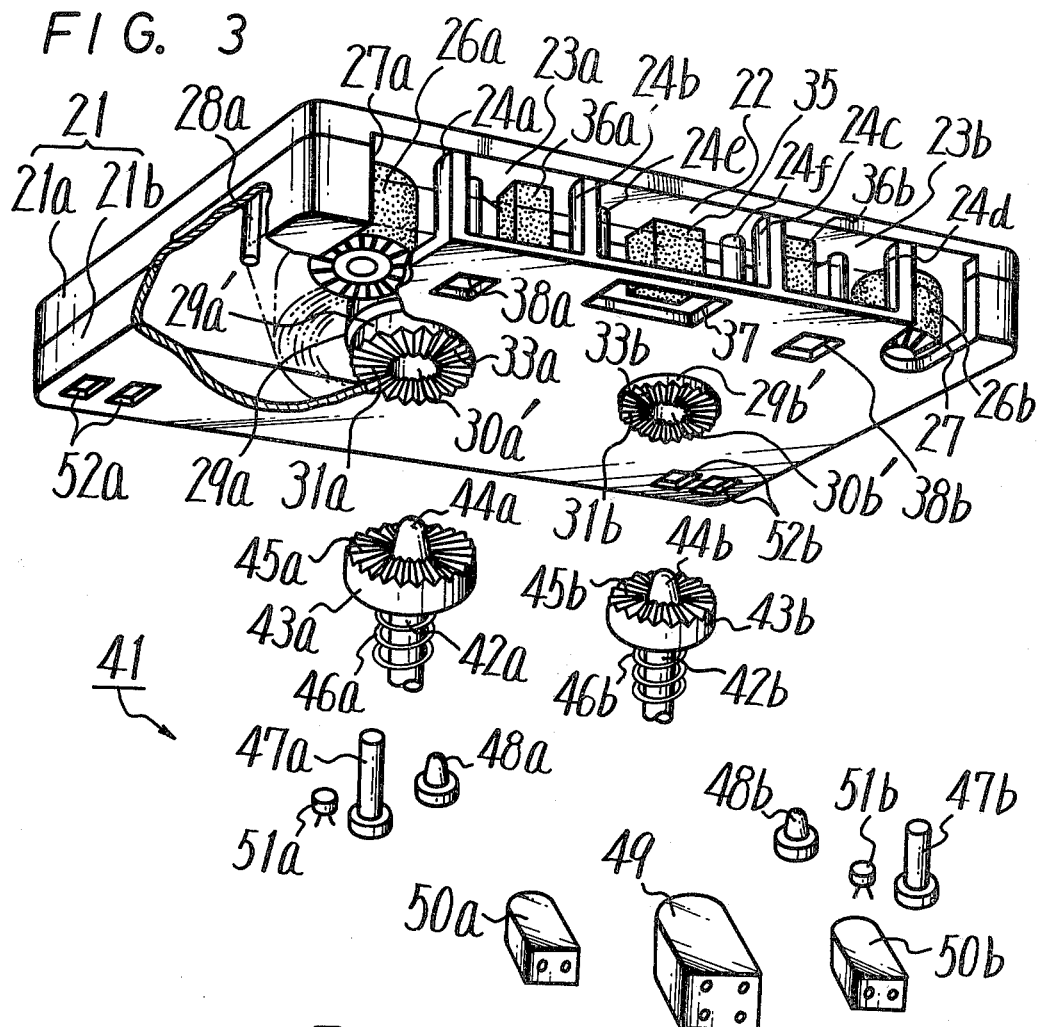
FIG. 3 is a perspective and exploded view used to explain in corresponding relationship between the tape cassette of the present invention and a tape driving mechanism portion of a tape recorder.

FIG. 2 is a cutaway perspective view of a tape cassette of the invention and FIG. 3 is a perspective cutaway exploded view of the cassette with the tape driving mechanism illustrated.

A tape cassette casing 21 has upper and lower halves 21a and 21b. The front side is formed with a central opening 22 through which a record and/or playback head can be inserted and side openings 23a and 23b are located symmetrically on both sides of the central opening 22 through which the erase head can be inserted. Along the inside front wall past the central opening 22 and the side openings 23a and 23b are mounted guide pins 24a, 24b, 24c, 24d, 24e and 24f to form a tape path 25. The cassette casing 21 has mounted therein pinch rollers 26a and 26b which are freely rotatable and are respectively mounted at opposite ends of the tape path 25 as illustrated. Aligned with the pinch rollers 26a and 26b and extending from the front side into the underside thereof are formed slots or cutout portions 27a and 27b so as to allow a capstan to engage the pinch rollers 26a and 26b. At positions behind the side portions of each of the pinch rollers 26a and 26b are mounted guide pins 28a and 28b respectively.

A pair of hubs 29a and 29b are symmetrically mounted within the casing 21. At the centers of the hubs on both upper and lower end surfaces are formed concave portions 30a, 30b and 30a' and 30b'. On the lower end surfaces of the hubs 29a and 29b are formed protruding members 29a' and 29b' with the lower concave portions 30a' and 30b' formed at the centers thereof. The protruding members 29a' and 29b' have diameters which are smaller than the outer diameter of each of the hubs 29a and 29b. On the end surfaces of the protruding members 29a' and 29b' are formed face gears with radially extending teeth 31a and 31b. Into the face gear radially extending teeth of the hubs 29a and 29b are inserted projecting members 32a and 32b which extend from the inner surface of the upper half 21a of the cassette and have a top which is nearly spherically shaped and extending surfaces 29a' and 29b' attached to the lower end surfaces of the hubs 29a and 29b engage circular shaped openings 33a and 33b which are formed in the lower half 21b of the tape cassette so that the hubs 29a and 29b are positioned and mounted so as to keep the predetermined axial distance between them. With this condition, the face gear radially extending teeth members 31a and 31b of both of the hubs 29a and 29b are respectively exposed and extend beyond the undersurface of the cassette casing 21 so that they can mate with the driving member which is external to the cassette.

Figure 4:
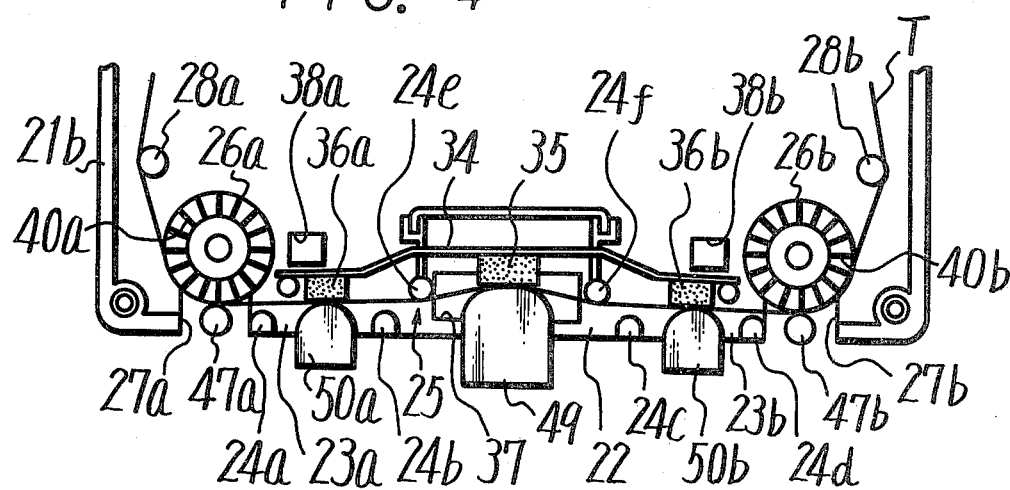
FIG. 4 is a plan view for illustrating how the tape cassette of the present invention is loaded into the tape driving mechanism.
Figure 5:
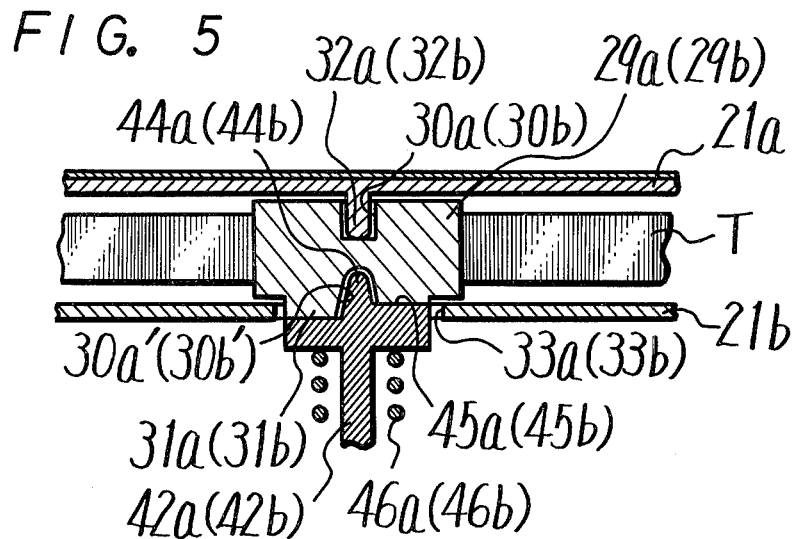
FIG. 5 is a partially cross-sectional view of this hub showing how they engage with the driving shafts.
Figure 6:
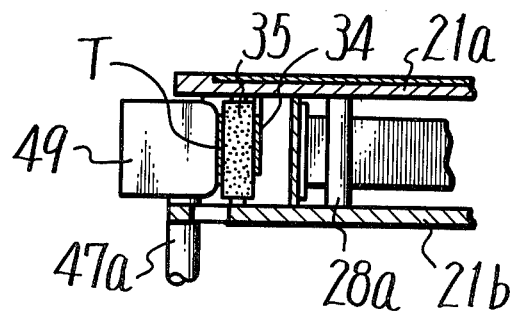
FIG. 6 is a partially cross-sectional view of the record or playback head showing how it is inserted into the tape cassette.
Figure 7:
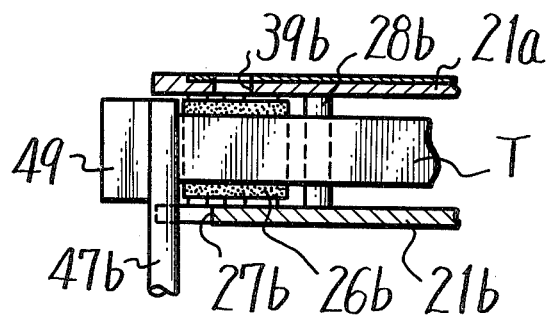
FIG. 7 is a partially cross-sectional view showing how a capstan is inserted into the tape cassette.

FIG. 4 illustrates a resilient piece or leaf spring 34 which is mounted within the cassette casing 21 along the inside of the tape path 25 and has its central front surface attached to a pad 35 which is adjacent the central opening portion 22 and which is maintained in close contact with the record and/or playback head 49 and on both sides of the front surface there attached pads 36a and 36b which are opposite the side openings 23a and 23b and which are mounted closely adjacent the erase head 50a and 50b, respectively. On the lower surface of the cassette casing that is in the central part of the front edge portion of the lower side of the lower half 21b is formed an aperture window 37 which is wider than its depth relative to the bottom side of the cassette into which a pair of guide pins can be inserted. On both sides of the window aperture 37 there are formed positioning apertures 38a and 38b. Through both sides of the upper surface of the upper half 21a are bored holes 39a and 39b so as to expose the peripheral edge portions of the upper end surfaces of the pinch rollers 26a and 26b as illustrated in FIG. 2.

The end surfaces of the pinch rollers 26a and 26b are formed with stripes 40a and 40b which extend radially from the center thereof and comprise alternate black and white band-like strips which can be detected by a light detector. It is adequate to form such strips only on one side of the end surfaces, that is on the side where light-emitting diodes and/or other receiving elements are to be mounted.

FIG. 3 illustrates a tape driving mechanism 41 which has a pair of drive shafts 42a and 42b that are aligned with the face gears 31a and 31b. Hub receiving basis 43a and 43b are mounted on the drive shafts 42a and 42b and the bases have diameters which are the same as the protruding surfaces 29a' and 29b' of the hubs 29a and 29b of the tape cassette. At the center of the members 43a and 43b extend protruding convex members 44a and 44b which are receivable in the concave openings 30a' and 30b' of the hubs 29a and 29b. The top surfaces of the hub receiving bases 43a and 43b are formed with face gears with radially extending teeth 45a and 45b which are substantially identical with the face gears 31a and 31b of hubs 29a and 29b. The drive shafts 42a and 42b are spring biased upwardly by the springs 46a and 46b to hold the member 43a and 43b against the members 29a' and 29b'.

Capstans 47a and 47b are symmetrically located relative to the pinch rollers 26a and 26b of the tape cassette and positioning guide posts 48a and 48b record and/or playback head 49 and erase heads 50a and 50b are symmetrically mounted on opposite sides of the head 49. The tape driving mechanism 41 also is provided with light-emitting and/or receiving elements 51a and 51b adjacent the under surface of the cassette casing 21 and the cut-out portions 27a and 27b formed in the under surface of the lower half 21b so as to radiate light beams onto the stripes 40a and 40b on the end surfaces of the pinch rollers 26a and 26b and receive reflected light energy. The light-emitting and/or receiving elements 51a and 51b may be placed in alignment with openings 39a and 39b formed through the upper half 21a of the cassette.

On the under surface of the cassette casing 21 that is the under surface of the rear edge of the lower half 21b are formed detecting apertures 52a and 52b for various uses such as to prevent erasing of the tape or to actuate the various switches in tape selecting and for other purposes.

In use, to load the tape cassette according to the invention into the tape recorder, the cassette is inserted into the tape driving mechanism section in a horizontal direction which is a direction perpendicular to the axial directions of the drive shafts 42a and 42b.

When the tape cassette is inserted in this manner, the drive shafts 42a and 42b are pressed down by the under surface of the cassette casing 21 by the hub receiving bases 43a and 43b and the drive shafts are lowered against the spring bias of the springs 46a and 46b. When the concave members 30a' and 30b' in the under end surfaces of the hubs 29a and 29b are opposite the projecting members 44a and 44b on the hub receiving bases 43a and 43b, the drive shafts 42a and 42b will move upward due to the biasing force of the springs 46a and 46b to lock the projections 44a and 44b in the openings 30a' and 30b'. This allows the face gears 31a, 45a and 31b and 45b to mesh for driving engagement. The hubs 29a and 29b will be pressed upward and the bottom surfaces of the concave members 30a and 30b formed on its upper end surface sides will be firmly engaged with the top of the projections 32a and 32b for axial support.

The positioning apertures 38a and 38b of the cassette casing engage the positioning guide pins 48a and 48b so that the tape cassette will be supportively positioned in the tape driving section of the tape recorder and the hubs 29a and 29b and the drive shafts 42a and 42b will be in the coupled state so that rotary driving can occur. In this condition, the capstans 47a and 47b are pressed in contact by the pinch rollers 26a and 26b because the capstan engages the cut-out portions 27a and 27b formed through the cassette casing 21 and the tape T is firmly gripped between the capstans and the pinch rollers so that it will be driven.

Then the record and/or playback head 49 is inserted through the central opening 22 of the cassette casing 21 and the erase heads 50a and 50b are inserted through the side openings 23a and 23b so as to contact the tape T and the pads 35 and 36a or 36b presses the tape T outwardly so that the heads will be in close contact with the tape.

Under these conditions, the tape T is moved by rotation of the hubs 29a and 29b which are integrally rotated with the drive shafts 42a and 42b and the capstans 47a and 47b as recording or reproduction of the tape T is accomplished. As the tape T is moving, irridation of light beams on the end surfaces of the pinch rollers 26a and 26b on which the stripes 40a and 40b are formed by the light-emitting and/or receiving elements 51a and 51b. In other words, the velocity of the tape transport can be detected by detecting the rotational velocity of the pinch rollers 26a and 26b by irridating light and receiving reflected light and the tape transport velocity is detected and fed back to the drive motor not shown, for driving the drive shafts 42a and 42b and the capstans 47a and 47b so that the rotational velocity of each of the motors is controlled to cause the tape T to be transported at a constant velocity.

Figure 8:
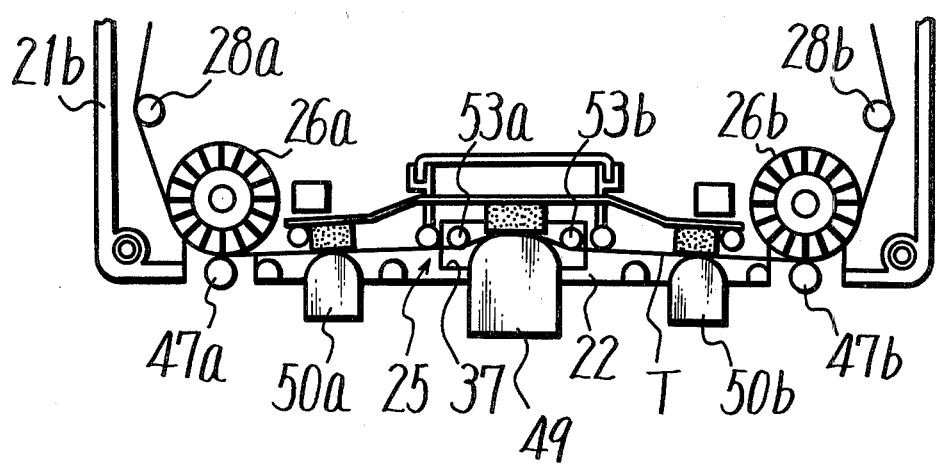
FIG. 8 is a plan view showing how the tape cassette of the invention is loaded into a tape driving mechanism portion.
Figure 9:
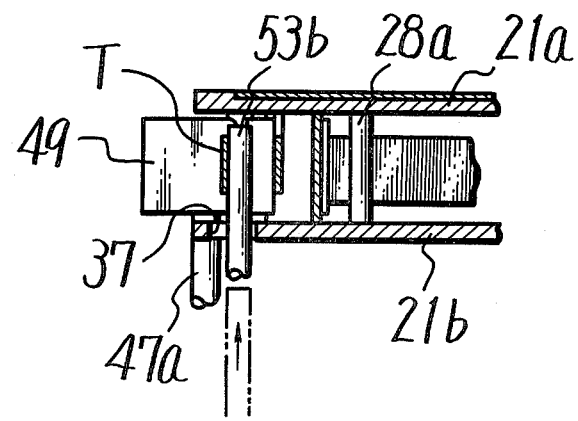
FIG. 9 is a partially cross-sectional view illustrating how the record and/or playback head is inserted into the tape cassette illustrated in FIG. 8.

The tape cassette in this embodiment can utilize the guide pins provided at the tape recorder side. The guide pins 53a and 53b illustrated in FIGS. 8 and 9 can be inserted into the window aperture 37 which is longer in width and are formed in the front edge control portion of the underside of the lower half 21 of the cassette casing 21 so that they face the central opening 22 and are used as the inside guide pins for the tape path 25. Each of the guide pins 53a and 53b can be made of precision metal and are formed with a higher precision than the guide pins which are integrally molded within the cassette casing 21 so that the tape T can be transported more accurately and stably.

The guide pins 53a and 53b are arranged such that when the cassette is loaded in the tape recorder they are lifted upward and inserted into the window aperture 37 of the tape cassette casing 21.

In the tape cassette according to the embodiment described above since the record and/or reproduction of the tape T is accomplished based upon a reverse system as the record and/or playback head 49 is utilized, a four-channel head or the head 49 is moved up and down in a forward and reverse direction transportation or moved by half a turn. Such arrangement is conventional and will not be described in detail herein.

For the case of normal record and/or reproduction where the record or reproduction of one side of the tape cassette is completed, the cassette is turned over so as to record or reproduce on the other side of the tape T and in the above embodiment, the face gears 31a and 31b are formed on both end surfaces of the hubs 29a and 29b and the face gears 31a and 31b of the hubs 29a and 29b are also exposed beyond the upper 21a of the cassette casing 21 and the capstan engaging cut-out portions 27a and 27b formed across the top to the bottom of the upper half 21a. It is sufficient that the tape driving mechanism section 41 of the tape recorder be provided with one capstan and one erase head as in a normal tape recorder. As described in the tape cassette according to the present invention since a pair of pinch rollers are provided at positions on both end portions of the tape path along the openings of the cassette casing into which the respective heads are inserted facing both of the pinch rollers, the opening portions and the capstan engaging cutout portions are formed across at least one of the upper and lower planes adjacent thereto and the face gears are formed on the centers of at least one end surfaces of the pair of hubs around which the tape is wound and the engaging members in the rotary direction are formed around the face gears so that when the tape cassette is loaded on the tape recorder it is not necessary that the hub driving shafts be inserted deeply into the cassette casing and the hub driving shafts can engage with the hubs on the surface of the cassette casing so that loading of the tape cassette from the horizontal direction perpendicular to the hub driving shafts can occur. This allows loading in a so-called slot can be accomplished and the loading operation is simple and thus an automatic changer apparatus for the tape cassette can be simply constructed.

Also, since the hubs are completely aligned with the driving shafts in the axial direction due to engagement by the face gears and hence the engaging members are engaged with the rotary direction of the driving shaft so that the hubs are integrally rotated together with the driving shaft so as to form a unitary body so that the tape can be transported in a stable manner with uniform tape tension from the start of the tape transport to the end of its running, thus, achieving improved recording and reproduction characteristics.

Although a single preferred embodiment is described, it will be apparent that many modifications and variations could be effected by one skilled in the art without departing from the spirit or scope of the novel concepts of the invention so that the scope of the invention is determined only by the appended claims.

We claim as our invention:

1. A tape cassette comprising, a cassette casing having a plurality of head inserting openings provided in its front surface, a tape path formed therein along the inside of said openings and a pair of hubs provided to wind therearound a tape transported along said tape path, a pair of pinch rollers mounted in said cassette at both end portions of said tape path, capstan engaging cut-out portions formed so as to oppose said pair of the pinch rollers across the surface on which said openings are formed and across at least one of the upper and lower surfaces adjacent thereto, a capstan receivable within at least one of said capstan engaging cut-out portions to drive said tape, driving gear portions formed on at least one end surface of each of said hubs, and driving gear means external to said cassette and engageable with said driving gear portions to drive them in a rotary direction, wherein at least one of said pair of pinch rollers is provided with a stripe pattern on the upper surface or the lower surface thereof, and wherein a through-hole is bored through at least one of the upper and lower halves of the cassette casing and opposed to said pinch roller and means for radiating and detecting said stripe pattern to detect the velocity of said tape mounted adjacent said through-hole.

2. A tape cassette comprising a flat planar case, a take-up reel and pay-out reel rotatably supported in said case and magnetic tape extending between said pay-out and take-up reels, a pinch roller rotatably supported in said case and engageable with said tape, a first face gear formed on said take-up reel and available for driving from outside said case, a first driving gear engageable with said first face gear of said take-up reel, and a first driving means external of said cassette flexibly connected to said first driving gear to drive it, including a second face gear formed on said pay-out reel and available for driving from outside said case and a second driving gear engageable with said second face gear, and a second drive means external of said cassette flexibly connected to said second driving gear to drive it, a through hole, and wherein said pinch roller is formed with stripes of contrasting colors on an end face thereof, and means for radiating and detecting said stripes to detect the velocity of said tape mounted adjacent said through hole, and including a portion of said case removed adjacent said pinch roller, and a capstan mounted so that it can engage said tape to drive it.

3. A tape cassette according to claim 2 wherein first and second face gears are formed with tapered openings and said first and second drive gears have tapered members receivable in said tapered openings of said first and second face gears.

4. A tape cassette according to claim 2 wherein said tape cassette can be inserted into a slot only slightly thicker than said case so as to engage first and second drive gears with said first and second face gears.

* * * * *